(12) United States Patent
Lee et al.

(10) Patent No.: US 9,294,819 B2
(45) Date of Patent: Mar. 22, 2016

(54) ELECTRONIC DEVICE AND METHOD OF CONTROLLING THE SAME

(75) Inventors: Sunggye Lee, Seoul (KR); Soongil Choi, Seoul (KR); Seongcheol Heo, Seoul (KR); Yongtaek Gong, Seoul (KR); Jungkil Kim, Seoul (KR)

(73) Assignee: LG ELECTRONICS INC., Changwon (KR)

( * ) Notice: Subject to any disclaimer, the term of this patent is extended or adjusted under 35 U.S.C. 154(b) by 0 days.

(21) Appl. No.: 14/362,056

(22) PCT Filed: Feb. 2, 2012

(86) PCT No.: PCT/KR2012/000801
§ 371 (c)(1),
(2), (4) Date: Jul. 8, 2014

(87) PCT Pub. No.: WO2013/100250
PCT Pub. Date: Jul. 4, 2013

(65) Prior Publication Data
US 2014/0359651 A1    Dec. 4, 2014

(30) Foreign Application Priority Data

Dec. 26, 2011   (KR) .................. 10-2011-0141887

(51) Int. Cl.
*H04N 7/16*  (2011.01)
*H04N 21/472*  (2011.01)
*G06F 3/01*  (2006.01)
(Continued)

(52) U.S. Cl.
CPC ............. *H04N 21/472* (2013.01); *G06F 3/017* (2013.01); *H04N 21/4223* (2013.01); *H04N 21/454* (2013.01); *H04N 21/4532* (2013.01);
(Continued)

(58) Field of Classification Search
CPC combination set(s) only.
See application file for complete search history.

(56) References Cited

U.S. PATENT DOCUMENTS

2004/0128093 A1* 7/2004 Cragun et al. .................. 702/79
2006/0184355 A1* 8/2006 Ballin et al. ...................... 704/8
(Continued)

FOREIGN PATENT DOCUMENTS

EP    1865719 A2   12/2007
JP    2006-311498 A  11/2006
(Continued)

OTHER PUBLICATIONS

Mennie (Associate Editor), "Consumer Electronics: Electronic Gamesmanship: It's man vs. microcircuit as video games entertain by challenging human skill (now) and intellect (soon)," IEEE Spectrum, vol. 13, No. 12, Dec. 1976, pp. 27-30.

*Primary Examiner* — Chenea Smith
(74) *Attorney, Agent, or Firm* — Birch, Stewart, Kolasch & Birch, LLP

(57) ABSTRACT

A method of controlling an electronic device, and which includes obtaining, via a camera of the electronic device, an image of a plurality of users viewing a display unit of the electronic device; receiving a predetermined gesture made from a first user for obtaining gesture control authority of the electronic device; displaying a graphic item corresponding to the first user who made the predetermined gesture; displaying a control graphic item indicating a current gesture control authority of the electronic device; receiving a first gesture input for changing a display state of the control graphic item; selecting the graphic item according to the changed display state of the control graphic item according to the first gesture input; and handing over the gesture control authority to the first user corresponding to the selected one graphic item.

20 Claims, 14 Drawing Sheets

(51) Int. Cl.
*H04N 21/4223* (2011.01)
*H04N 21/45* (2011.01)
*H04N 21/454* (2011.01)
*H04N 21/462* (2011.01)
*H04N 21/475* (2011.01)

(52) U.S. Cl.
CPC ....... *H04N21/4622* (2013.01); *H04N 21/4753* (2013.01); *H04N 21/47214* (2013.01)

(56) References Cited

U.S. PATENT DOCUMENTS

2007/0049255 A1* 3/2007 Bhakta et al. .............. 455/412.2
2007/0094620 A1 4/2007 Park
2010/0070987 A1* 3/2010 Amento et al. ................. 725/10
2010/0162177 A1 6/2010 Eves et al.
2011/0154266 A1* 6/2011 Friend et al. .................. 715/863
2011/0239117 A1* 9/2011 Sutton et al. .................. 715/706
2012/0182384 A1* 7/2012 Anderson et al. .......... 348/14.09
2012/0220338 A1* 8/2012 Degrazia et al. ........... 455/556.1

FOREIGN PATENT DOCUMENTS

KR 10-2008-0033352 A 4/2008
KR 10-2011-003849 A 1/2011
KR 10-2011-0132313 A 12/2011

* cited by examiner

U1 : current authorized user for gesture
U2, U3 : candidate authorized user for gesture Fig. 5
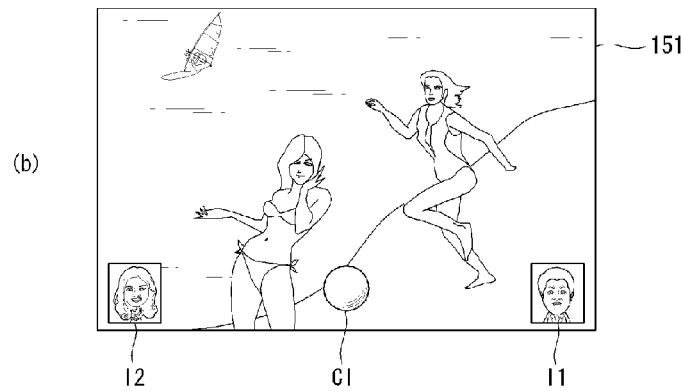
Fig. 6
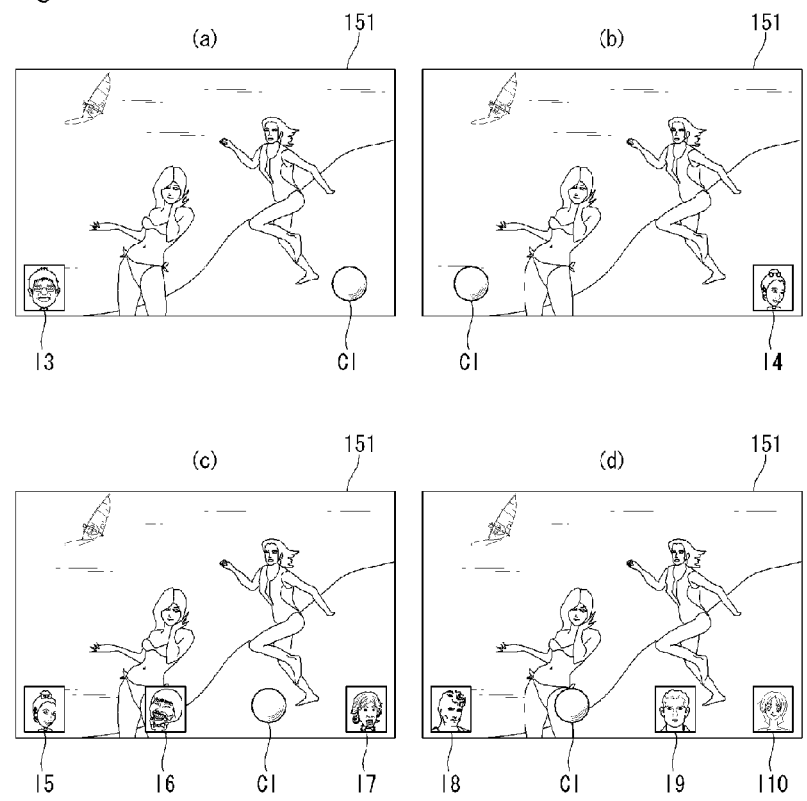

Fig. 14
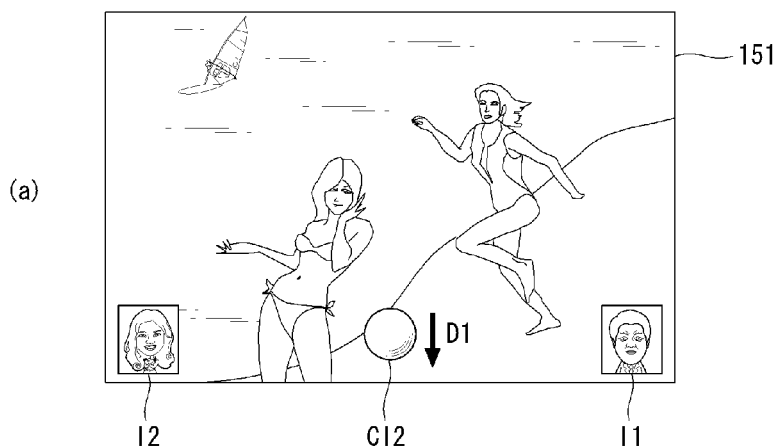
(a)
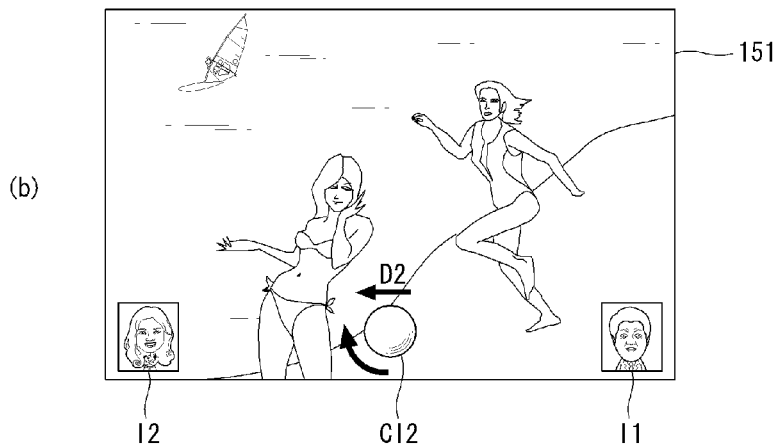
(b)

HANDOVER OF CONTROL AUTHORITY TO U3

Fig. 18
(a) 
(b) 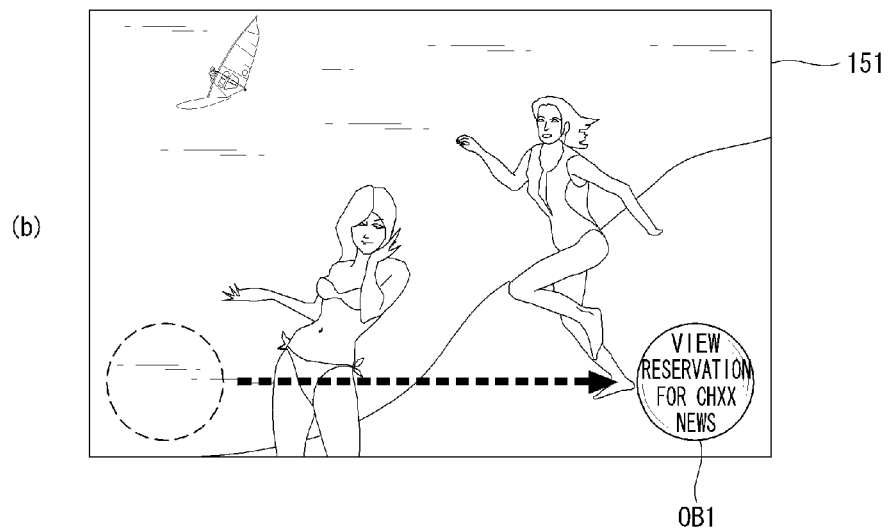

Fig. 19
(a)
(b)

Fig. 20
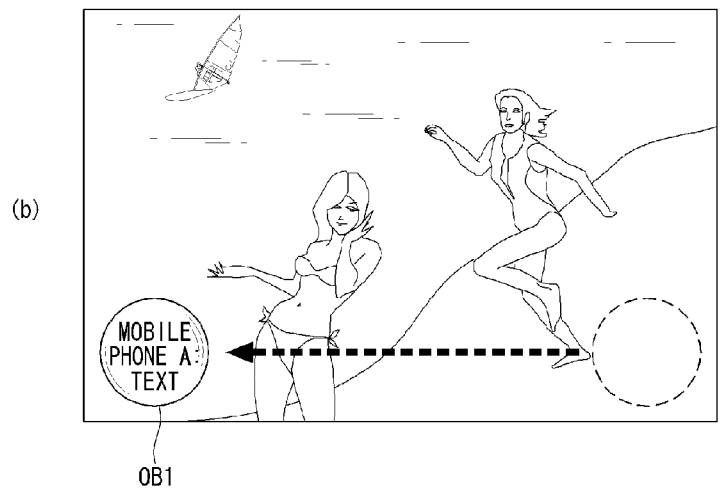
Fig. 21
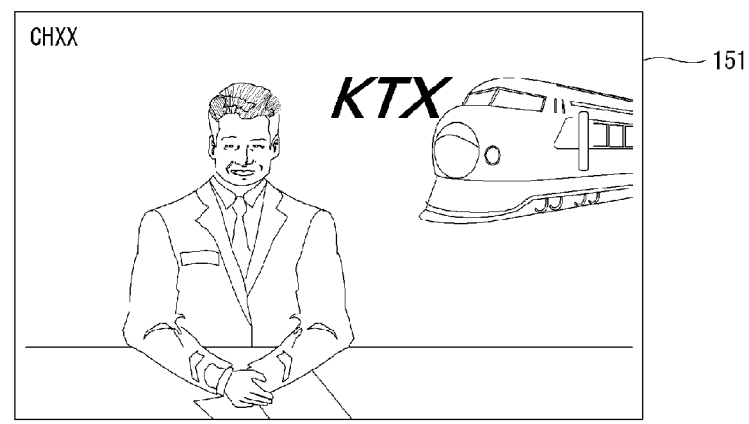

Fig. 22
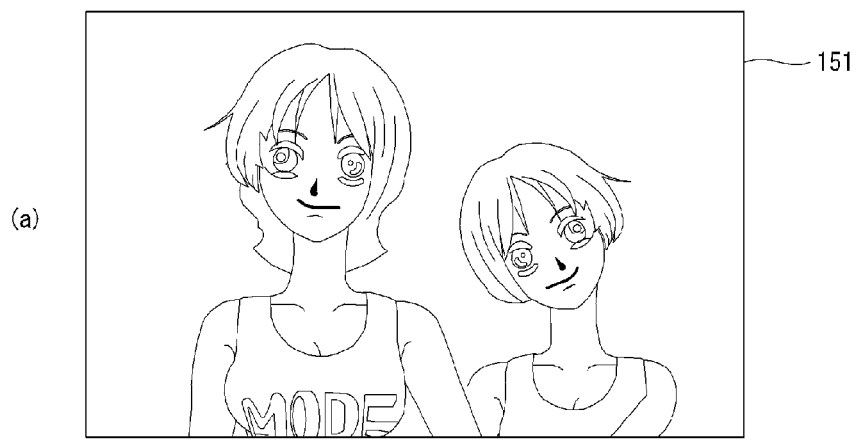
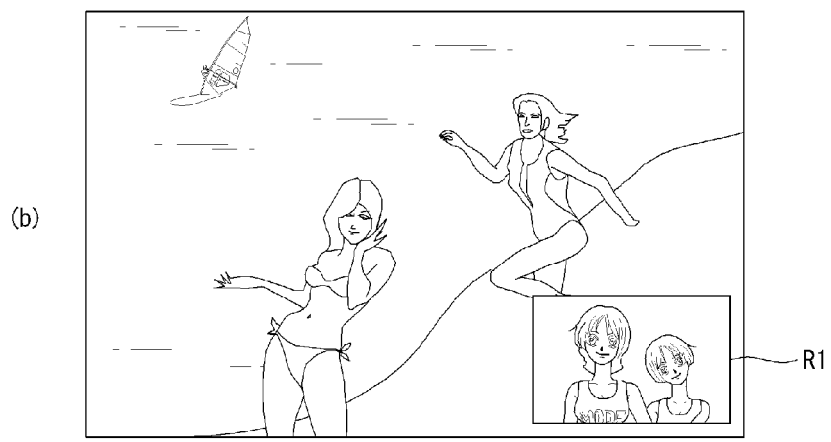
Fig. 23
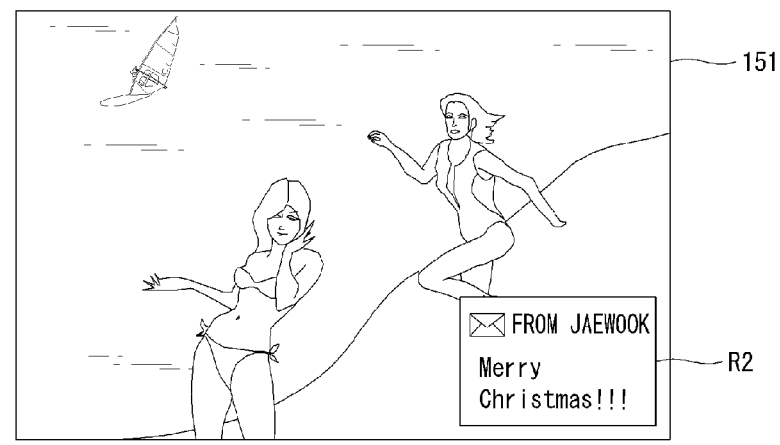

Fig. 24
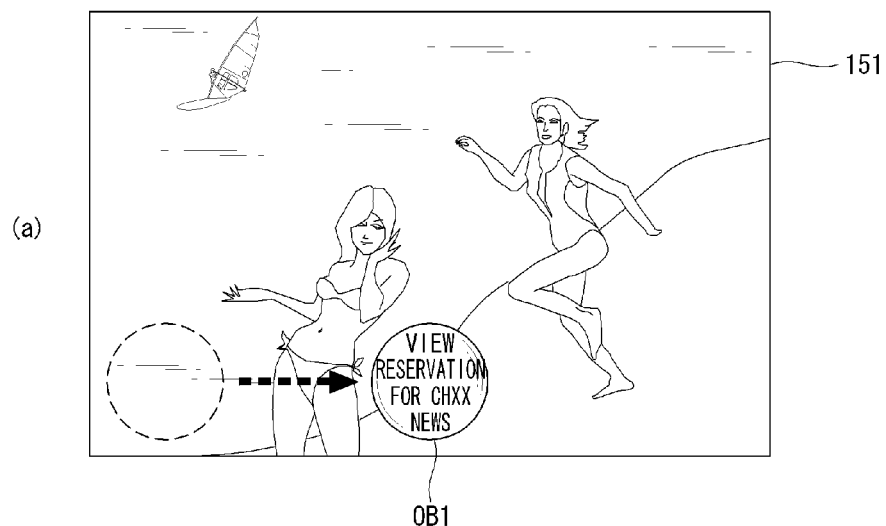
(a)
OB1
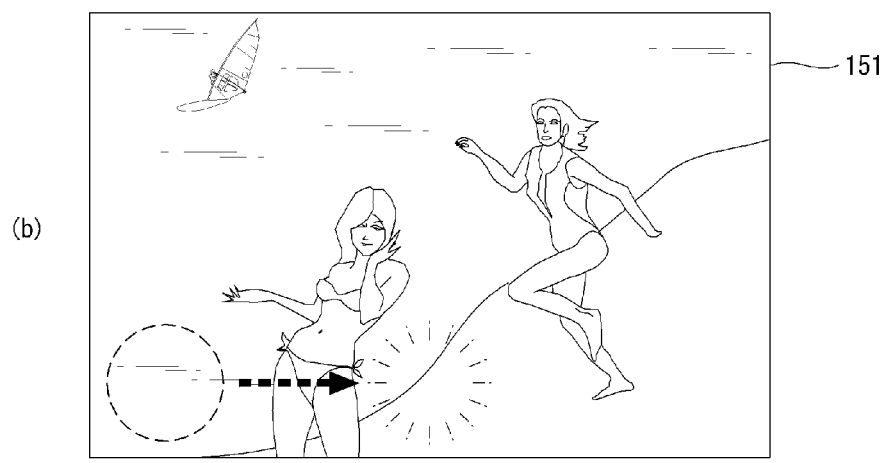
(b)

ELECTRONIC DEVICE AND METHOD OF CONTROLLING THE SAME

TECHNICAL FIELD

The present invention relates to electronic devices and methods of controlling the electronic devices and more specifically to electronic devices that operate based on gesture inputs and method of controlling the electronic devices.

BACKGROUND ART

Ongoing research has been intensively conducted to analyze a user's gesture using a device such as a camera and to adopt the user's gesture as a user interface, thereby replacing or using together various user interface devices such as touch pads or touch screens as have been generally used.

However, when in analyzing a user's gesture and operating in response thereto, a plural of gesture's are made by plural users, it needs to be determined which user's gesture is to be analyzed and used as an input to an electronic device.

To address this, a concept for the gesture, "control authority", has been created, and there has been intensive research as to methods of users' obtaining the control authority for gesture entry and/or methods of transferring the control authority from a user to another.

SUMMARY OF THE INVENTION

Technical Problem

An object of the present invention is to provide electronic devices that may easily hand control authority over from to another user and methods of controlling the electronic devices. Another object of the present invention is to provide electronic devices that may easily notify a user that a predetermined event has occurred so that he may perform an operation related to the event and methods of controlling the electronic devices.

According to a first embodiment of the present invention, there is provided a method of controlling an electronic device comprising a first step of displaying at least one first item corresponding to each of at least one candidate authorized user in response to a predetermined input, a second step of displaying a second item whose display state is changed according to a gesture, a third step of selecting one of the at least one first item according to a display state of the second item changed according to a first gesture input, and a fourth step of handing over control authority for gesture to a candidate authorized user corresponding to the selected one.

The predetermined input may be input by the at least one candidate authorized user.

The first gesture input may be input by a current authorized user. A relationship in display location between the first item and the second item may reflect a relationship in location between the current authorized user and the candidate authorized user.

The display state of the second item may include at least one of a location, size, pointing direction, color, brightness, and transparency of the item.

According to a second embodiment of the present invention, there is provided a method of controlling an electronic device comprising a first step of identifying an attribute of an event when the event occurs, a second step of determining a moving attribute of an object displaying content of the event according to an attribute of the event, and a third step of displaying the object while moving the object according to the determined moving attribute.

The moving attribute may include at least one of a start display point, end display point, moving speed, and moving trajectory of the object.

The method may further comprise a fourth step of performing a function corresponding to the event when a predetermined first gesture is input while the object is displayed.

The method may further comprise a fifth step of stopping displaying the object when a predetermined second gesture is input while the object is displayed.

According to the present invention, the following effects may be provided.

First, in the case that the electronic device receives a gesture input from a user to perform a necessary operation, control authority is provided to a user requiring control authority among a plurality of users, thus increasing user convenience.

Second, the control authority for gesture is handed over not by a unilateral request from a user who does not presently own the control authority for gesture by a specific gesture of the authorized user who owns the control authority, so that any inconvenience due to loss of the current authorized user's control authority may be minimized.

Third, the handover of the control authority for gesture is displayed through the display unit of the electronic device, thus providing further intuitive and easy-to-use user interfaces.

Fourth, by displaying an object reflecting content of an event that has occurred to a user in different manners according to a predetermined event attribute, the electronic device may provide the content of the event to user more intuitively.

Finally, the electronic device may perform a predetermined operation associated with the event in response to a user's simple gesture input.

BRIEF DESCRIPTION OF DRAWINGS

FIG. 5 is a view for describing displaying first and second items corresponding to authorized users for gesture according to the first embodiment of the present invention.

FIG. 6 illustrates various examples of displaying first and second items according to the first embodiment of the present invention.

FIGS. 11 to 15 are views for describing various examples of displaying the display state of the second item according to the first embodiment of the present invention.

FIGS. 18 to 20 are views illustrating examples of displaying an object while moving the object according to the second embodiment of the present invention.

FIGS. 21 to 23 are views for describing examples of performing a function corresponding to an event according to the second embodiment of the present invention.

FIG. 24 illustrates an example where display of the object is stopped in response to input of a second gesture according to the second embodiment.

DETAILED DESCRIPTION OF EMBODIMENTS OF THE INVENTION

The foregoing objects, features, and advantages of the present invention will be more apparent from the detailed description taken in conjunction with the accompanying drawings. The exemplary embodiments of the present invention will be described in greater detail with reference to the drawings. Descriptions on known functions or configurations associated with the present invention, which are determined to make the gist of the invention unnecessarily unclear, are omitted.

Hereinafter, electronic devices relating to the present invention will be described below in more detail with reference to the accompanying drawings. In the following description, suffixes "module" and "unit" are given to components of the mobile terminal in consideration of only facilitation of description and do not have meanings or functions discriminated from each other.

Figure 1:
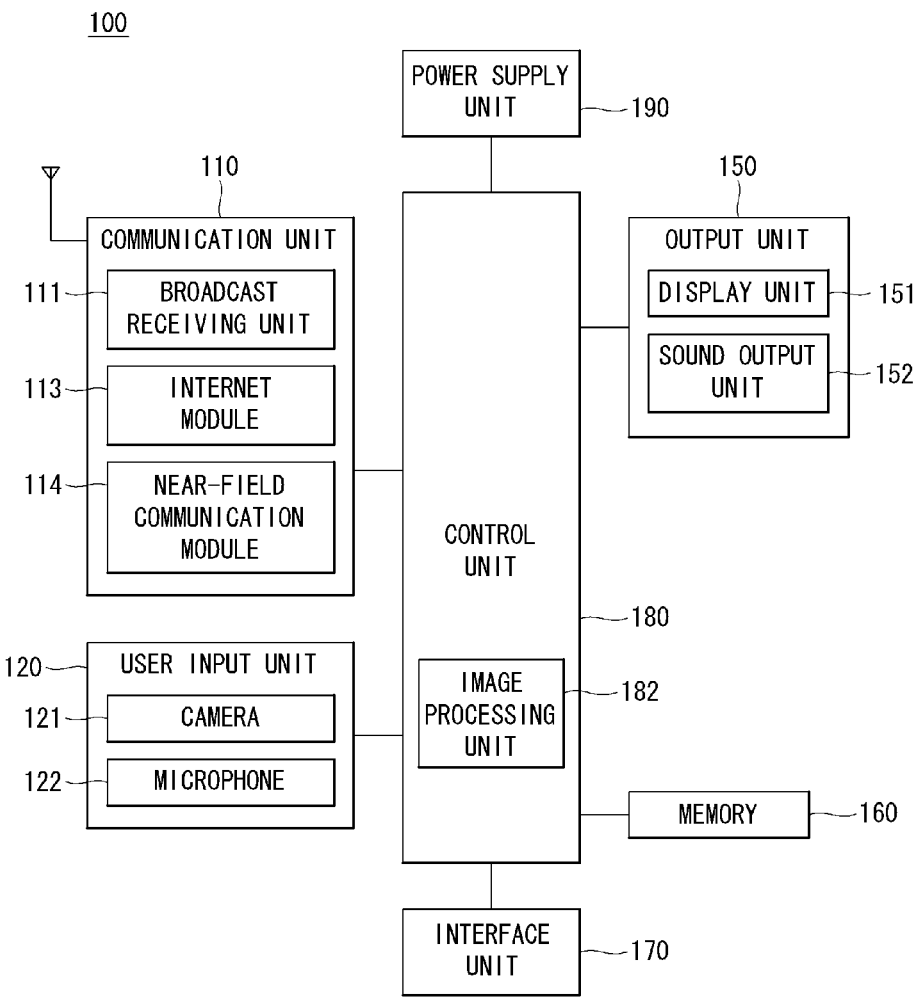
FIG. 1 is a block diagram illustrating an electronic device according to an embodiment of the present invention.

FIG. 1 is a block diagram illustrating an electronic device according to an embodiment of the present invention.

Referring to FIG. 1, the electronic device 100 includes a communication unit 110, a user input unit 120, an output unit 150, a memory 160, an interface unit 170, a control unit 180, and a power supply unit 190. The components shown in FIG. 1 may be components that may be commonly included in an electronic device. Accordingly, more or less components may be included in the electronic device 100.

The communication unit 110 may include one or more modules that enable communication between the electronic device 100 and a communication system or between the electronic device 100 and another device. For instance, the communication unit 110 may include a broadcast receiving unit 111, an Internet module 113, and a near-field communication module 114.

The broadcast receiving unit 111 receives broadcast signals and/or broadcast-related information from an external broadcast managing server through a broadcast channel.

The broadcast channel may include a satellite channel and a terrestrial channel. The broadcast managing server may refer to a server that generates broadcast signals and/or broadcast-related information and broadcasts the signals and/or information or a server that receives pre-generated broadcast signals and/or broadcast-related information and broadcasts the signals and/or information to a terminal. The broadcast signals may include TV broadcast signals, radio broadcast signals, data broadcast signals as well as combinations of TV broadcast signals or radio broadcast signals and data broadcast signals.

The broadcast-related information may refer to information relating to broadcast channels, broadcast programs, or broadcast service providers. The broadcast-related information may be provided through a communication network.

The broadcast-related information may exist in various forms, such as, for example, EPGs (Electronic Program Guides) of DMB (Digital Multimedia Broadcasting) or ESGs (Electronic Service Guides) of DVB-H (Digital Video Broadcast-Handheld).

The broadcast receiving unit 111 may receive broadcast signals using various broadcast systems. Broadcast signals and/or broadcast-related information received through the broadcast receiving unit 111 may be stored in the memory 160.

The Internet module 113 may refer to a module for access to the Internet. The Internet module 113 may be provided inside or outside the electronic device 100.

The near-field communication module 114 refers to a module for near-field communication. Near-field communication technologies may include Bluetooth, RFID (Radio Frequency Identification), IrDA (Infrared Data Association), UWB (Ultra Wideband), and ZigBee technologies.

The user input unit 120 is provided for a user's entry of audio or video signals and may include a camera 121 and a microphone 122.

The camera 121 processes image frames including still images or videos as obtained by an image sensor in a video call mode or image capturing mode. The processed image frames may be displayed by the display unit 151. The camera 121 may perform 2D or 3D image capturing or may be configured as one or a combination of 2D and 3D cameras.

The image frames processed by the camera 121 may be stored in the memory 160 or may be transmitted to an outside device through the communication unit 110. According to an embodiment, two or more cameras 121 may be included in the electronic device 100.

The microphone 122 receives external sound signals in a call mode, recording mode, or voice recognition mode and processes the received signals as electrical voice data. The microphone 122 may perform various noise cancelling algorithms to remove noises created when receiving the external sound signals. A user may input various voice commands through the microphone 122 to the electronic device 100 to drive the electronic device 100 and to perform functions of the electronic device 100.

The output unit 150 may include a display unit 151 and a sound output unit 152.

The display unit 151 displays information processed by the electronic device 100. For example, the display unit 151 displays a UI (User Interface) or GUI (Graphic User Interface) associated with the electronic device 100. The display unit 151 may be at least one of a liquid crystal display, a thin film transistor liquid crystal display, an organic light emitting diode display, a flexible display, and a 3D display. The display unit 151 may be configured in a transparent or light transmissive type, which may be called a "transparent display" examples of which include transparent LCDs. The display unit 151 may have a light-transmissive rear structure in which a user may view an object positioned behind the terminal body through an area occupied by the display unit 151 in the terminal body.

According to an embodiment, two or more display units 151 may be included in the electronic device 100. For instance, the electronic device 100 may include a plurality of display units 151 that are integrally or separately arranged on a surface of the electronic device 100 or on respective different surfaces of the electronic device 100.

When the display unit 151 and a sensor sensing a touch (hereinafter, referred to as a "touch sensor") are layered (this layered structure is hereinafter referred to as a "touch sensor"), the display unit 151 may be used as an input device as well as an output device. The touch sensor may include, for example, a touch film, a touch sheet, or a touch pad.

The touch sensor may be configured to convert a change in pressure or capacitance, which occurs at a certain area of the display unit 151, into an electrical input signal. The touch sensor may be configured to detect the pressure exerted during a touch as well as the position or area of the touch.

Upon touch on the touch sensor, a corresponding signal is transferred to a touch controller. The touch controller processes the signal to generate corresponding data and transmits the data to the control unit 180. By doing so, the control unit 180 may recognize the area of the display unit 151 where the touch occurred.

The sound output unit 152 may output audio data received from the communication unit 110 or stored in the memory 160. The sound output unit 152 may output sound signals associated with functions (e.g., call signal receipt sound, message receipt sound, etc.) performed by the electronic device 100. The sound output unit 152 may include a receiver, a speaker, and a buzzer.

The memory 160 may store a program for operation of the control unit 180, and may preliminarily store input/output data (for instance, phone books, messages, still images, videos, etc.). The memory 160 may store data relating to vibrations and sounds having various patterns, which are output when the touch screen is touched.

The memory 160 may include at least one storage medium of flash memory types, hard disk types, multimedia card micro types, card type memories (e.g., SD or XD memories), RAMs (Random Access Memories), SRAM (Static Random Access Memories), ROMs (Read-Only Memories), EEPROMs (Electrically Erasable Programmable Read-Only Memories), PROM (Programmable Read-Only Memories), magnetic memories, magnetic discs, and optical discs. The electronic device 100 may operate in association with a web storage performing a storage function of the memory 160 over the Internet.

The interface unit 170 functions as a path between the electronic device 100 and any external device connected to the electronic device 100. The interface unit 170 receives data or power from an external device and transfers the data or power to each component of the electronic device 100 or enables data to be transferred from the electronic device 100 to the external device. For instance, the interface unit 170 may include a wired/wireless headset port, an external recharger port, a wired/wireless data port, a memory card port, a port connecting a device having an identification module, an audio I/O (Input/Output) port, a video I/O port, and an earphone port.

The control unit 180 controls the overall operation of the electronic device 100. For example, the control unit 180 performs control and processes associated with voice call, data communication, and video call. The control unit 180 may include an image processing unit 182 for image process. The image processing unit 182 is described below in relevant parts in greater detail.

The power supply unit 190 receives internal or external power under control of the control unit 180 and supplies the power to each component for operation of the component.

The embodiments described herein may be implemented in software or hardware or in a combination thereof, or in a recording medium readable by a computer or a similar device to the computer. When implemented in hardware, the embodiments may use at least one of ASICs (application specific integrated circuits), DSPs (digital signal processors), DSPDs (digital signal processing devices), PLDs (programmable logic devices), FPGAs (field programmable gate arrays, processors, controllers, microcontrollers, microprocessors, and electrical units for performing functions. According to an embodiment, the embodiments may be implemented by the control unit 180.

When implemented in software, some embodiments, such as procedures or functions, may entail a separate software module for enabling at least one function or operation. Software codes may be implemented by a software application written in proper programming language. The software codes may be stored in the memory 160 and may be executed by the control unit 180.

Figure 2:
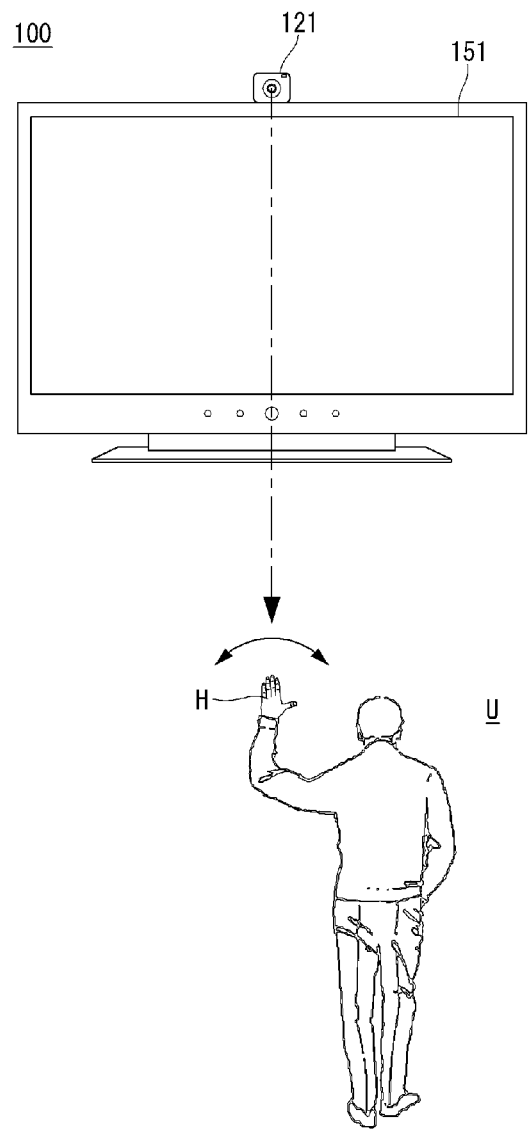
FIG. 2 is a view illustrating an example where a user inputs a gesture to an electronic device as shown in FIG. 1.

FIG. 2 is a view illustrating an example where a user inputs a gesture to an electronic device as shown in FIG. 1.

Referring to FIG. 2, the electronic device 100 may capture the gesture of the user U and may perform a proper function corresponding to the gesture.

The electronic device 100 may be any electronic device having the display unit 151 that can display images. The electronic device 100 may be a stationary terminal, such as a TV shown in FIG. 2, which is bulky and thus placed in a fixed position, or may be a mobile terminal such as a cell phone. The electronic device 100 may include the camera 121 that may capture the gesture of the user U.

The camera 121 may be an optical electronic device that performs image capturing in a front direction of the electronic device 100. The camera 121 may be a 2D camera for 2D image capturing and/or a 3D camera for 3D image capturing. Although in FIG. 2 one camera 121 is provided at a top central portion of the electronic device 100 for ease of description, the number, location, and type of the camera 121 may vary as necessary.

The control unit 180 may trace a user U having control authority when discovering the user U. The issue and trace of the control authority may be performed based on an image captured by the camera 121. For example, the control unit 180 may analyze a captured image and continuously determine whether there a specific user U exists, whether the specific user U performs a gesture necessary for obtaining the control authority, and whether the specific user U moves or not.

The control unit 180 may analyze a gesture of a user having the control authority based on a captured image. For example, when the user U makes a predetermined gesture but does not own the control authority, no function may be conducted. However, when the user U has the control authority, a predetermined function corresponding to the predetermined gesture may be conducted.

The gesture of the user U may include various operations using his/her body. For example, the gesture may include the operation of the user sitting down, standing up, running, or even moving. Further, the gesture may include operations using the user's head, foot, or hand H. For convenience of illustration, a gesture of using the hand H of the user U is described below as an example. However, the embodiments of the present invention are not limited thereto.

A first embodiment of the present invention is hereinafter described in greater detail. For ease of description, the first embodiment is implemented by the electronic device 100 described in connection with FIG. 1. However, a method of controlling the electronic device according to the first embodiment is not limited to being implemented by the electronic device 100.

A method of controlling an electronic device according to the first embodiment is directed to effective handover of control authority for gesture from a current authorized user for gesture, who has control authority for gesture at present, to a candidate authorized user for gesture among a plurality of users upon commanding or entry into the electronic device by the user's gesture.

Figure 3:
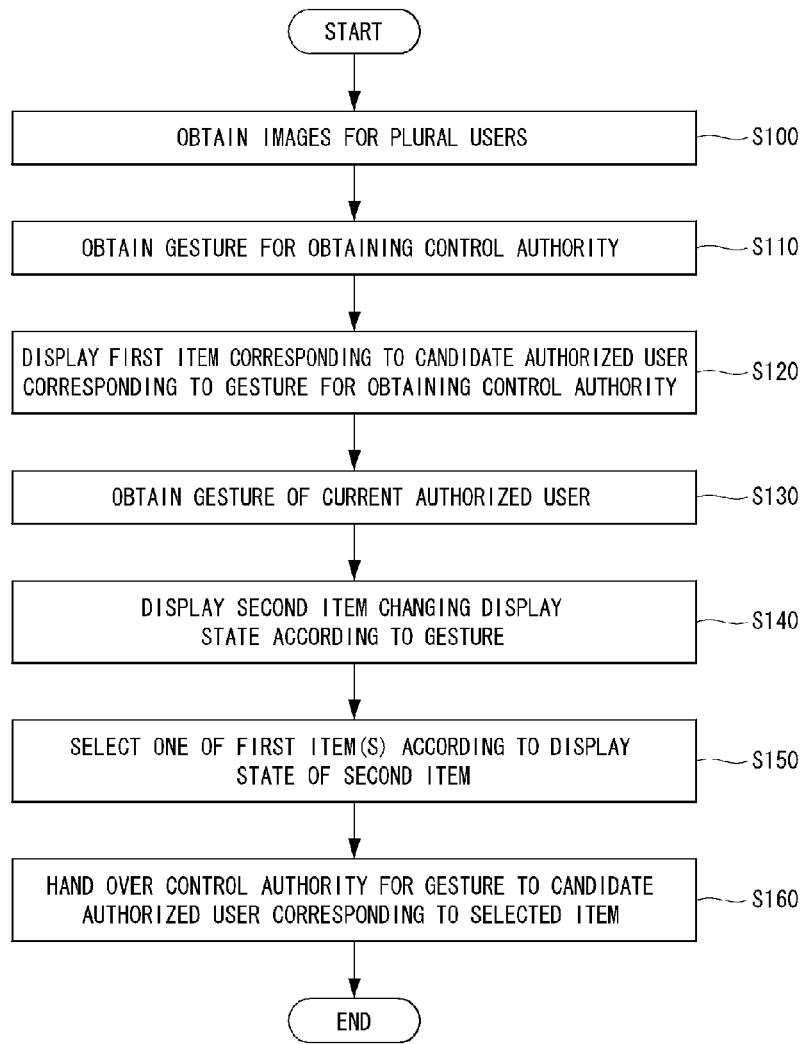
FIG. 3 is a flowchart describing a method of controlling an electronic device according to a first embodiment of the present invention.

FIG. 3 is a flowchart describing a method of controlling an electronic device according to a first embodiment of the present invention. Referring to FIG. 3, the control method includes at least one or more of a step of obtaining images of a plurality of users (S100), a step of obtaining at least one specific gesture for obtaining control authority (S110), a step of displaying at least one first item corresponding to a candidate authorized user corresponding to a control authority obtaining gesture (S120), a step of obtaining a gesture of a current authorized user (S130), a step of displaying a second item while changing a display state of the second item according to the gesture of the current authorized user (S140), a step of selecting one of the at least one first item according to a changed display state of the second item (S150), and a step of handing over the control authority for gesture to a candidate authorized user corresponding to the selected first item (S160).

Each step is hereinafter described in greater detail.

The electronic device 100 may obtain images for a plurality of users through the camera 121 (S100). Step S100 may be provided to analyze various gestures that may be made by the plurality of users.

While performing step S100, the electronic device 100 may obtain at least one specific gesture for obtaining control authority (S110). This is described with reference to FIG. 4.

Figure 4:
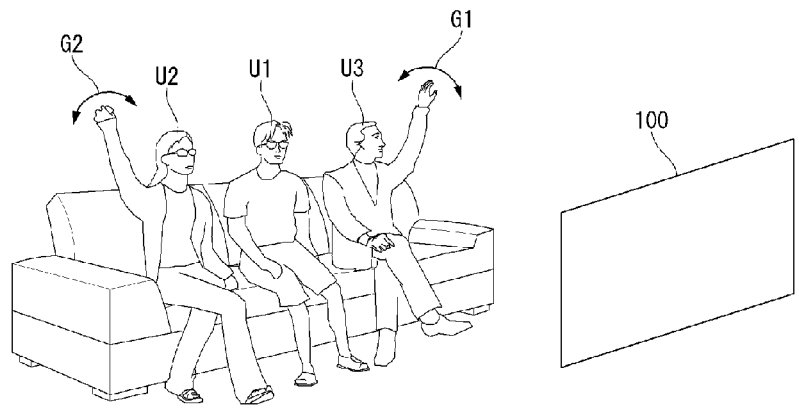
FIG. 4 is a view for describing an example where a candidate authorized user makes a gesture for obtaining control authority according to the first embodiment.

FIG. 4 is a view for describing an example where a candidate authorized user makes a gesture for obtaining control authority according to the first embodiment. Referring to FIG. 4, a first user U1 may be the current authorized user for gesture who presently has control authority for gesture. At this time, as shown in FIG. 4, second and third users U2 and U3 who do not have control authority for gesture may make predetermined gestures G1 and G2. The specific gestures G1 and G2 may be previously determined for obtaining gesture.

As shown in FIG. 4, the electronic device 100 may monitor whether the second and third users U2 and U3 make the predetermined gestures by analyzing the images obtained in step S100 (S100).

In step S110, the electronic device 100 may consider the second and third users U2 and U3 as candidate authorized users for gesture.

On the other hand, although it is illustrated in FIG. 4 that two users U2 and U3 make the specific gestures for obtaining control authority, the number of users who makes the specific gesture for obtaining control authority is not limited. At any event, the electronic device 100 may consider any users who made the specific gesture for obtaining control authority as the candidate authorized users.

If the candidate authorized users are determined in step S110, the electronic device 100 may display at least one first item corresponding to at least one candidate authorized user who made the specific gesture for obtaining control authority (S120).

The at least one first item may be displayed through the display unit 151.

The at least one first item may be actual images of the candidate authorized users U2 and U3, and may be virtual images (for example, virtual avatar images) corresponding to the candidate authorized users U2 and U3.

The number of the at least one first item displayed may be the same as the number of the candidate authorized users. For example, in the case that as shown in FIG. 4 the number of the candidate authorized users is two, two first items may be displayed.

When displaying the at least one first item, the electronic device 100 may also display the second item on the display unit 151.

FIG. 5 is a view for describing displaying first and second items corresponding to authorized users for gesture according to the first embodiment of the present invention. Referring to FIG. 5, (a) of FIG. 5 illustrates an example where a screen is displayed through the display unit 151 of the electronic device 100 before a gesture by which the candidate authorized users obtain control authority in step S110 is obtained, and (b) of FIG. 5 illustrates an example where first items I1 and I2 whose number is equal to the number of the candidate authorized users U2 and U3 and a second item CI are displayed on the display unit 151 after the candidate authorized users are determined in step S110.

On the other hand, as shown in FIG. 4, (b) of FIG. 5 illustrates an example where in the case that two users U2 and U3 positioned at both sides of the current authorized user U1 make their gestures for obtaining control authority, the first items and second item are displayed on the display unit 151. In the case that the number of the candidate authorized users is one or three, as described below, the first and second items may be displayed on the display unit 151.

FIG. 6 illustrates various examples of displaying first and second items according to the first embodiment of the present invention.

(a) and (b) of FIG. 6 illustrate examples of a first item I3 or I4 and a second item CI when a user makes a gesture for obtaining control authority. That is, when there is one candidate authorized user, one first item I3 or I4 may be displayed on the display unit 151.

On the other hand, (a) of FIG. 6 illustrates an example where a third user U3 positioned at the left of a first user U1 who is a current authorized user is determined as a candidate authorized user, and (b) of FIG. 6 illustrates an example where a second user U2 positioned at the right of the first user U1 is determined as a candidate authorized user. As shown in (a) and (b) of FIG. 6, a relative relationship between a location where the first item I3 or I4 is displayed and a location where the second item CI is displayed may reflect a relative relationship in location between the first user U1 who is the current authorized user and the candidate authorized user U2 or U3. That is, if the candidate authorized user U3 is located at the left of the current authorized user U1, the first item I3 corresponding to the candidate authorized user U3 may be located at the left of the second item CI, and vice versa.

(c) and (d) of FIG. 6 illustrate examples of displaying first items I5, I6, and I7 or I8, I9, and I10 and the second item CI when three users make a gesture for obtaining control authority. That is, when there are three candidate authorized users, three first items I5, I6, and I7 or I8, I9, and I10 may be displayed on the display unit 151.

On the other hand, (c) of FIG. 6 illustrates an example where two candidate authorized users and one candidate authorized user are located at the left and right, respectively, of a current authorized user, and (d) of FIG. 6 illustrates an example where one candidate authorized user and two candidate authorized users are located at the left and right, respectively, of the current authorized user. As shown in (c) and (d) of FIG. 6, a relative relationship between locations where the first items I5, I6, and I7 or I8, I9, and I10 and a location where the second item CI may reflect a relative relationship in location between the current authorized user and candidate authorized users.

Although it has been described that the second item CI is displayed while the first item is simultaneously displayed, it is not necessary to display the second item while performing step S120 at the same time. That is, displaying the first item may be done while performing step S130 or S140 to be described below. Functions of the second item will be described below in greater detail.

Turning back to FIG. 4, the electronic device 100 may obtain a gesture of the current authorized user (S130) and display the second item while changing a display state of the second item according to the current authorized user's gesture (S140).

FIGS. 7 to 10 are views for describing a method of changing a display state of the second item according to the current authorized user's gesture according to the first embodiment of the present invention.

Figure 7:
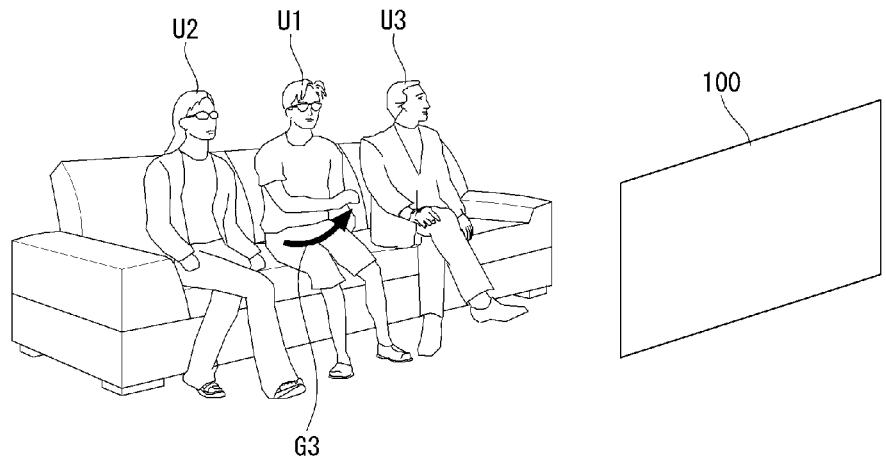
FIGS. 7 to 10 are views for describing a method of changing a display state of the second item according to the current authorized user's gesture according to the first embodiment of the present invention.

The electronic device 100, for example, as shown in FIG. 7, may sense that the current authorized user U1 makes a specific gesture G3 (S130). That is, the first user U1 may make a gesture G3 of moving his arm and/or hand toward the third user U3, and this may be sensed by the electronic device 100. As another example, as shown in FIG. 9, the current authorized user U1 may make a gesture G4 of moving his arm and/or hand toward the second user located at his right.

Figure 8:
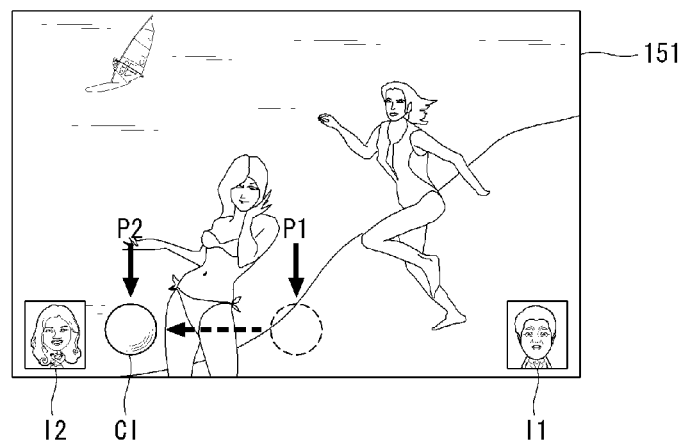

When a gesture G3 as shown in FIG. 7 is input, the display state of the second item CI may change to that shown in FIG. 8 (S140). That is, as shown in FIG. 8, the second item CI which has been located at a first position P1 may gradually move to a second position P2 that is positioned at the left of the first position P1 in response to the input of the specific gesture G3 into the electronic device 100. Accordingly, the second item CI may gradually move toward the first item I2 corresponding to the second user U2.

Figure 9:
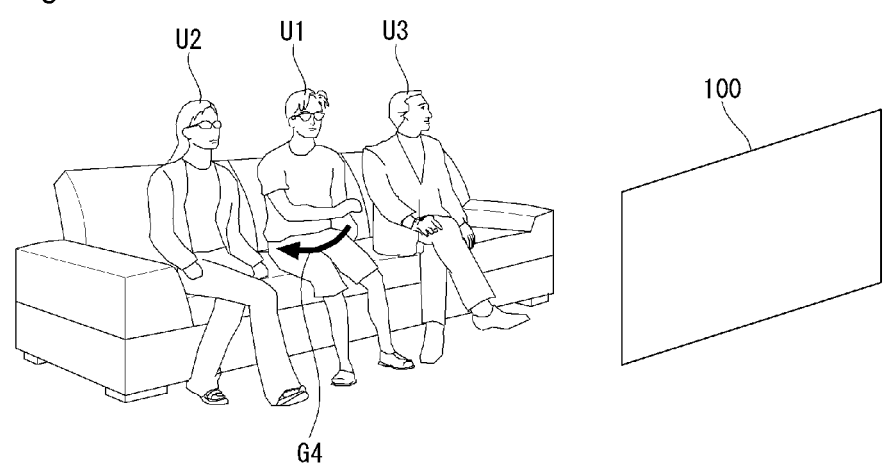
Figure 10:
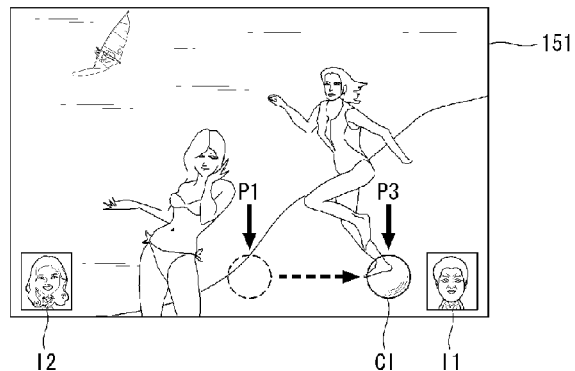

On the other hand, when a gesture G3 as shown in FIG. 9 is received, the display state of the second item CI may change to that shown in FIG. 10 (S140). That is, as shown in FIG. 10, the second item CI which has been located at the first position P1 may gradually move to a third position P3 that is located at the right of the first position P1 in response to an the input of the specific gesture G4 into the electronic device 100. Accordingly, the second item CI may gradually move toward the first item I3 corresponding to the third user U3.

As described in connection with FIGS. 7 to 10, the display state of the second item CI may be changed by reflecting moving features of the specific gesture G3 or G4 input by the current authorized user. That is, a moving direction of the second item CI may be determined based on a moving direction of the specific gesture G3 or G4.

Other than those described in connection with FIGS. 7 to 10, various methods of changing the display state of the second item according to the current authorized user's gesture according to the first embodiment may be provided.

FIGS. 11 to 15 are views for describing various examples of displaying the display state of the second item according to the first embodiment of the present invention.

Figure 11:
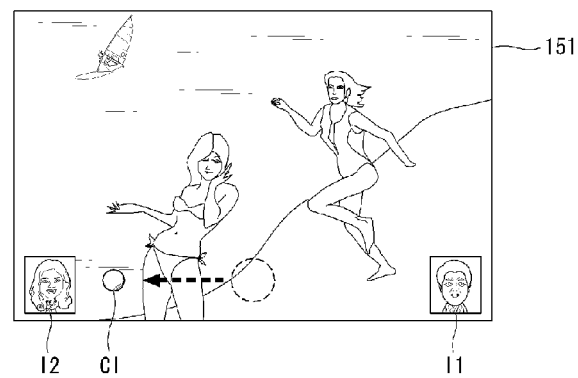

Referring to FIG. 11, when a gesture as shown in FIG. 7 is input, the electronic device 100 may gradually reduce the size of the second item CI while simultaneously moving the second item CI to the left in changing the display state of the second item CI.

Figure 12:
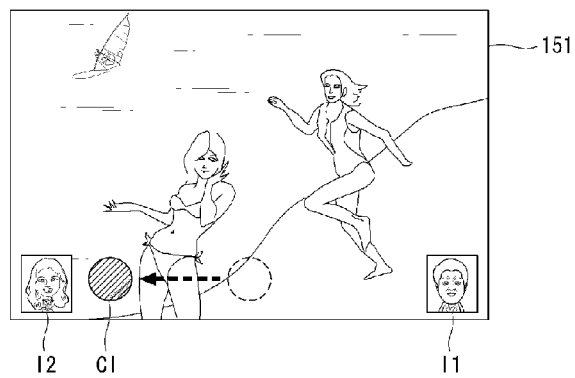

Referring to FIG. 12, when a gesture as shown in FIG. 7 is input, the electronic device 100 may color, brightness, or transparency of the second item CI while simultaneously moving the second item CI to the left in changing the display state of the second item CI.

Figure 13:
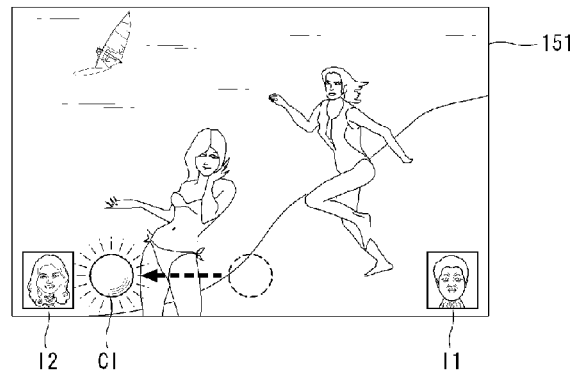

Referring to FIG. 13, when a gesture as shown in FIG. 7 is input, the electronic device 100 may gradually highlight the second item CI while simultaneously moving the second item CI to the left in changing the display state of the second item CI. On the other hand, as described above, it is not necessary to change the location of the second item CI while changing the display state of the second item in response to the gesture G3 or G4 of the current authorized user U1.

For example, as shown in FIG. 14, when the second item CI has directivity, the display state of the second item CI may be changed by varying a pointing direction of the second item CI.

That is, as shown in (a) of FIG. 14, in the case that the second item CI is displayed together with an arrow oriented in a first direction D1, when a gesture is input as shown in FIG. 7, the electronic device 100 may change the display state of the second item CI so that the second item CI is directed toward a second direction D2 as shown in (b) of FIG. 14. Accordingly, the pointing direction of the second item CI may be changed to be oriented toward the first item U2 corresponding to the third user U3.

In changing the display state of the second item CI in response to the gesture G3 or G4 of the current authorized user U1, when the second item CI is moved, a moving speed and/or moving distance of the second item CI may be determined based on a speed and/or distance of the gesture G3 or G4.

Figure 15:
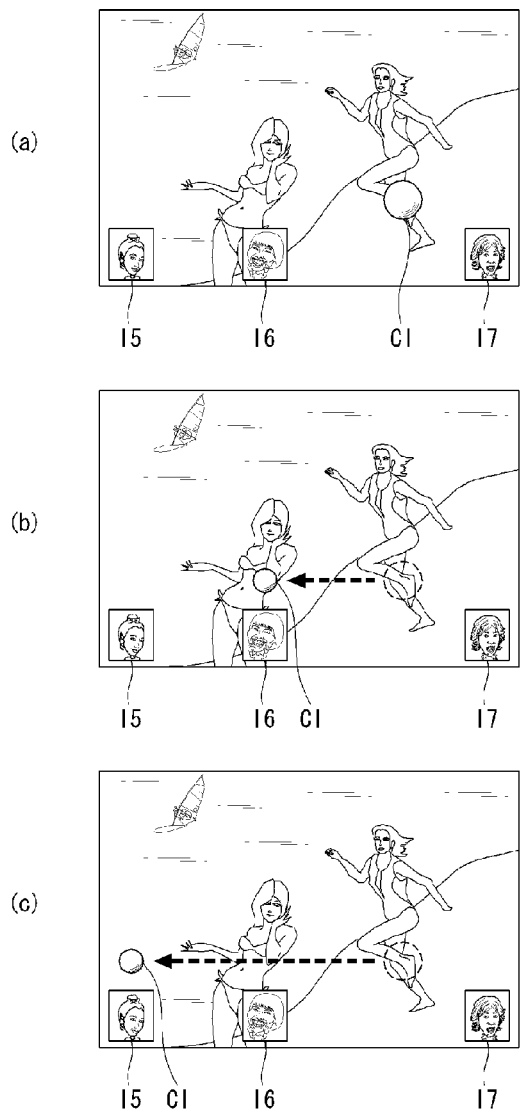

For example, as shown in (a) of FIG. 15, there may an example where two candidate authorized users are positioned at the left of the current authorized user and accordingly second items I5 and I6 respectively reflecting the candidate authorized users are displayed at the left of the second item CI.

At this time, when the current authorized user makes a gesture having a first speed v1 in the direction shown in FIG. 7, the second item CI may change its size while moving to a position corresponding to a position of the second item I6 as shown in (b) of FIG. 15. On the contrary, when the gesture has a second speed v2 (v2>v1), the second item CI may change its size while moving to a position corresponding to a position of the second item I5 as shown in (c) of FIG. 15. That is, when the gesture has the second speed more than the first speed, the moving distance of the second item CI may be determined to be different. On the other hand, although not shown in the drawings, the moving speed of the second item CI may vary with the speed of the gesture.

Further, in the case that the gesture is made in the direction as shown in FIG. 7, when the gesture moves by a first distance s1, the second item CI may change its size while moving to a position corresponding to a position of the second item I6 as shown in (b) of FIG. 15. On the contrary, when the gesture moves by a second distance s2 (s2>s1), the second item CI may change its size while moving to a position corresponding to a position of the second item I5 as shown in (c) of FIG. 15. That is, when the gesture moves as long as the second distance more than the first distance, the moving distance of the second item CI may be determined to be different. On the other hand, although not shown in the drawings, the moving speed of the second item CI may also vary with the distance of the gesture.

Subsequently, referring to FIG. 4, the electronic device 100 may select one of the at least one first item according to a changed display state of the second item (S150). Various methods may apply to selecting one of the at least one first item according to the changed display state of the second item.

For example, when changing the display location of the second item in step S140, the electronic device 100 may select one of the at least one first item considering a final display location of the second item CI. That is, when the display location of the second item CI is changed in response to the current authorized user's gesture as shown in FIG. 8, the electronic device 100 may select the first item I2 closer to the changed location of the second item CI among the two first items I1 and I2. Under the circumstance as shown in FIG. 15, when the location of the second item CI is determined by the current authorized user's gesture as shown in (b) of FIG. 15, the first item I6 may be determined among the three first items I5, I6, and I7. On the contrary, under the circumstance as shown in (c) of FIG. 15, the first item I5 may be determined among the three first items I5, I6, and I7.

As another example, when changing the size of the second item CI in step S140, the electronic device 100 may select one of the at least one first item considering a final display size of the second item CI. That is, the electronic device 100 may select as one of the at least one first item the one corresponding to a display location of the second item CI when the size of the second item CI, which is moving while changing its size in response to the current authorized user's gesture, reaches a predetermined size. That is, as shown in FIG. 11, when the first second item CI on the way toward the first item I2 shrinks and disappears (that is, when the predetermined size is '0'), the first item I2 may be selected among the first items I1 and I2.

As another example, when changing color, brightness, and/or transparency of the second item CI in step S140, the electronic device 100 may select one of the at least one first item considering final color, brightness, and/or transparency of the second item CI displayed. That is, the electronic device 100 may select as one of the at least first item the one corresponding to a location of the second item CI displayed when the size of the second item CI corresponds to a predetermined color, brightness, and/or transparency while the second item CI moves changing its color, brightness, and/or transparency according to the current authorized user's gesture. That is, as shown in FIG. 12, in the case that while the second item CI moves toward the first item I2, the second item CI happens to have the predetermined color, brightness, and/or transparency near the second item I2, the first item I2 may be selected among the two items I1 and I2.

If the first item is selected in step S150, the electronic device 100 may hand control authority for gesture over to a candidate authorized user corresponding to the selected first item (S160).

Figure 16:
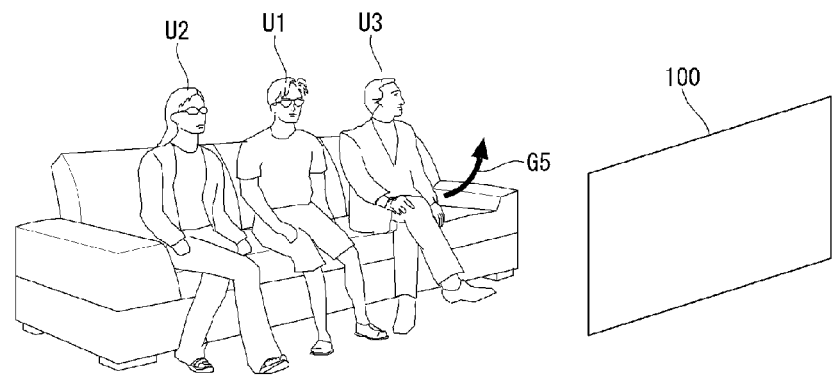
FIG. 16 is a view illustrating an example where control authority for gesture has been handed over to another user according to the first embodiment of the present invention.

That is, as shown in FIG. 8, in the case that the second item CI moves toward the first item I2 located at the left and accordingly the first item I2 is selected in step S150, the control authority for gesture may be handed over to the third user U3 (refer to FIG. 4 or 7) who is the candidate authorized user corresponding to the first item I2. Accordingly, the electronic device 100, after performing step S160, may receive a third user's gesture G5 to perform a necessary operation as shown in FIG. 16. On the contrary, in the case of that shown in FIG. 10, the control authority for gesture may be handed over to the second user U2 who is a candidate authorized user corresponding to the first item I1.

If the control authority for gesture is handed over to a specific user, the electronic device 100 analyzes a gesture of the specific user who took over the control authority for gesture without analyzing a gesture of a previous authorized user for gesture who had had the control authority before and performs an operation corresponding to a gesture command input by the specific user.

As such, in the case that the electronic device 100 receives a user's gesture input and performs a necessary operation, user convenience may be increased by allocating control authority to a user requiring the control authority among a plurality of users. On the other hand, the control authority for gesture is handed over not by a unilateral request from a user who does not presently own the control authority for gesture by a specific gesture of the authorized user who owns the control authority, so that any inconvenience due to loss of the current authorized user's control authority may be minimized. Further, the handover of the control authority for gesture is displayed through the display unit 151 of the electronic device 100, thus providing further intuitive and easy-to-use user interfaces.

Meanwhile, although it has been described in the first embodiment that the users enter predetermined gestures to obtain the control authority in steps S100 and S110, user's entry for obtaining the control authority may be achieved by other methods than the gestures. For instance, a user who desires to obtain the control authority may be a candidate authorized user by inputting a predetermined voice command. Besides, an input to be a candidate authorized user may be done by other input methods as well.

A second embodiment of the present invention will now be described in greater detail. For convenience of description, the second embodiment is assumed to be implemented by the electronic device 100 described in connection with FIG. 1. However, a method of controlling an electronic device according to the second embodiment is not limited to being implemented by the electronic device 100 described in connection with FIG. 1.

A control method of an electronic device according to the second embodiment is directed to a method of providing a user interface that may easily notify a user of occurrence of events and allows a user to easily perform an operation associated with the event.

Figure 17:
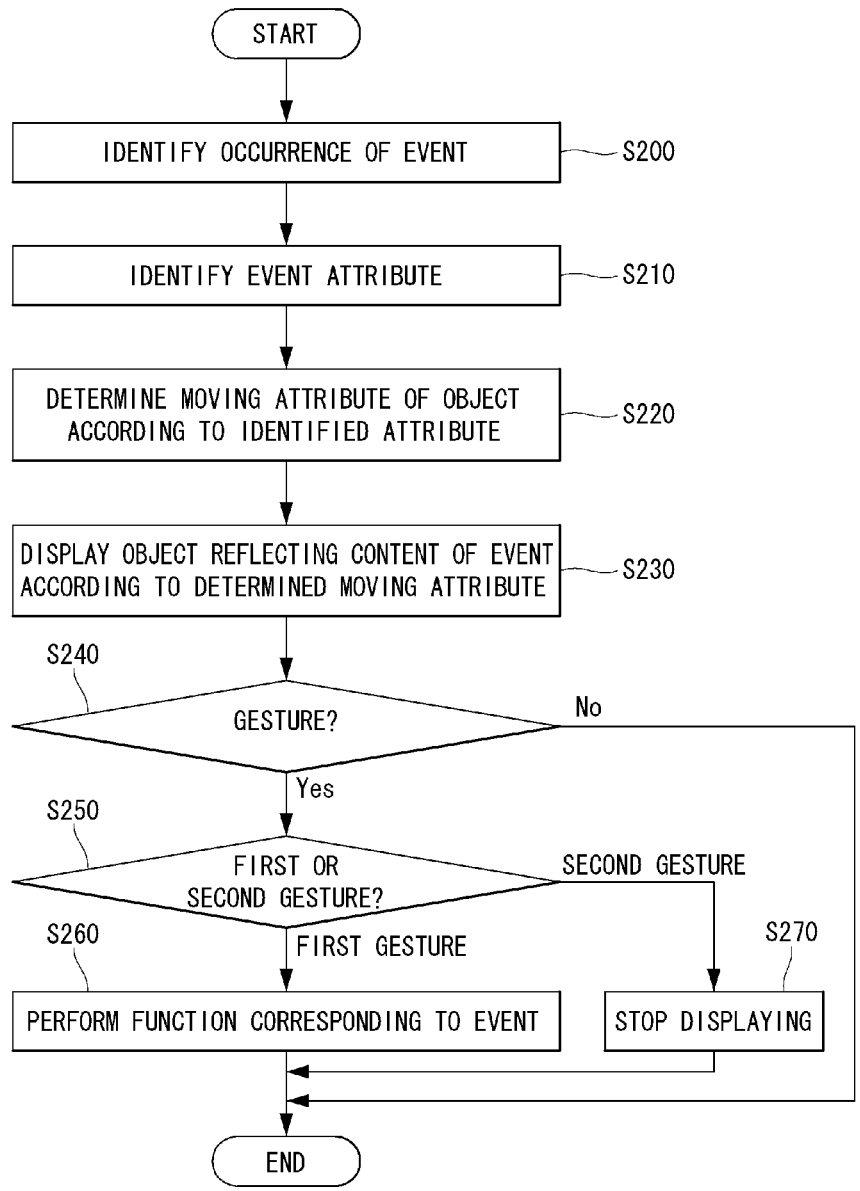
FIG. 17 is a flowchart illustrating a method of controlling an electronic device according to the second embodiment of the present invention.

FIG. 17 is a flowchart illustrating a method of controlling an electronic device according to the second embodiment of the present invention. Referring to FIG. 17, the control method according to the second embodiment includes at least one of a step of identifying an occurrence of an event (S200), a step of identifying an attribute of the event (S210), a step of determining a moving attribute of an object according to the identified event attribute (S220), a step of displaying an object reflecting content of an event occurring according to the determined moving attribute (S230), a step of identifying whether a predetermined gesture is input from a user (S240), a step of, when the gesture is input, identifying whether the input gesture is a first gesture or second gesture (S250), a step of, when the input gesture is the first gesture, performing a function corresponding to the event that has occurred (S260), and a step of, when the input gesture is the second gesture, stopping displaying the object (S270).

Hereinafter, each step is specifically described.

The electronic device 100 may monitor whether a predetermined event has occurred (S200).

The predetermined event may be an event associated with the electronic device 100 or an event associated with another electronic device other than the electronic device 100.

The event associated with the electronic device 100 may include, for example, call reception for the electronic device 100, message reception for the electronic device 100, arrival of a reserved view time according to a TV view reservation set to the electronic device 100, arrival of a reserved recording time according to a recording reservation set to the electronic device 100, a schedule time according to a user schedule input set to the electronic device 100 (for example, an appointment time), and when information necessary to be known to a user by various software installed in the electronic device 100 and/or a system in charge of operations of the electronic device 100 is obtained.

The event associated with another electronic device other than the electronic device 100 may include, for example, call reception for another electronic device (e.g., a mobile phone) used by the user, message reception for the other electronic device, arrival of a reserved view time according to a TV view reservation set to the other electronic device, arrival of a reserved recording time according to a recording reservation set to the other electronic device, a schedule time according to a user schedule input set to the other electronic device (for example, an appointment time), and when information necessary to be known to a user by various software installed in the other electronic device and/or a system in charge of operations of the other electronic device is obtained.

If the predetermined event is an event associated with the other electronic device, the electronic device 100 may identify the occurrence of the predetermined event by receiving information on the fact that the predetermined event has occurred from the other electronic device.

Subsequently, the electronic device 100 may identify an attribute of the identified event (S210).

The attribute of the event may include the type of an electronic device associated with the event that has occurred (for example, whether the electronic device is the electronic device 100 or not, or whether the electronic device is the first, second, or third electronic device) and the type of the event (for example, call reception, message reception, view reservation, recording reservation, arrival of schedule, etc.).

After step S210, the electronic device 100 may determine a moving attribute of an object based on the identified event attribute (S220).

The object, as specifically described below, is the one displayed on the display unit 151 reflecting content of the event that has occurred.

On the other hand, the moving attribute of the object may include at least one of a start point of the object displayed, an end point of the object displayed, a moving speed of the object, and a pattern of a moving trajectory of the object.

The electronic device 100 may correspond the attribute (that is, type of the electronic device associated with the event and type of the event) to at least one or more moving attributes of the object. Such correspondence may be a value preset in the electronic device 100 or may be a value set separately from the event.

In the case that the event attribute and moving attribute of the objet are preset, such attributes may be values preset by a manufacturer of the electronic device 100 or may be values that have been customized by a user of the electronic device 100.

Various correspondences may be used between the event attribute and moving attribute of the object.

According to the type of electronic device associated with the event, which is an event attribute, one of the moving attributes of the object may be determined. Thus, according to the type of the event, which is another event attribute, another moving attribute of the object may be determined. For instance, according to the type of electronic device associated with the event, a start display point of the object may be determined, and according to the type of the event, a moving speed of the object may be determined. Or according to the type of electronic device associated with the event, a start display point of the object may be determined, and according to the type of the event, a moving trajectory pattern of the object may be determined.

On the other hand, it is not necessary for one object moving attribute to be determined by one event attribute, and two or more moving attributes of the object may be determined by one event attribute. For example, according to the type of electronic device associated with the event, a start display point and end display point of the object may be determined, and according to the type of the event, a moving speed and/or a moving trajectory pattern of the object may be determined.

For example, according to the type of electronic device associated with the event, a start display point of the object may be determined, and according to the type of the event, at least two or more of an end display point of the object, a moving speed of the object, and a moving trajectory pattern of the object may be determined.

If the moving attribute of the object is determined in step S220, the electronic device 100 may display an object reflecting content of the event that has occurred according to the determined moving attribute (S230). That is, the electronic device 100 may display the object on the display unit 151 while moving the object by reflecting a start display point of the object, an end display point of the object, a moving speed of the object, and a moving trajectory pattern of the object as determined in step S220. Hereinafter, referring to FIGS. 18 to 20, specific examples of displaying the object while moving are described.

FIGS. 18 to 20 are views illustrating examples of displaying an object while moving the object according to the second embodiment of the present invention.

FIG. 18 illustrates an example where an event that has occurred is a 'view reservation' set to the electronic device 100. Further, referring to FIG. 18, in the case that an electronic device associated with the event is the electronic device 100, a start display point of an object OB1 corresponds to a 'left and lower portion' of the screen, and when the type of the event is a 'view reservation', an end display point of the object OB1 corresponds to a 'right and lower portion' of the screen and a moving trajectory pattern of the object corresponds to a 'straight line'.

FIG. 19 illustrates an example where the event that has occurred is 'call reception' of a 'mobile phone A'. Further, referring to FIG. 19, in the case that an electronic device associated with the event is the mobile phone A, a start display point of an object OB2 corresponds to a 'left and lower portion' of the screen, and when the type of the event is 'call reception', an end display point of the object OB2 corresponds to a 'right and upper portion' of the screen and a moving trajectory pattern of the object corresponds to a 'zig-zag line'.

FIG. 20 illustrates an example where the event that has occurred is 'text reception' of a 'mobile phone A'. Further, referring to FIG. 20, in the case that an electronic device associated with the event is the mobile phone A, a start display portion of an object OB3 corresponds to a 'left and lower portion' of the screen, and when the type of the event is 'text reception', an end display point of the object OB3 corresponds to a 'right and lower portion' of the screen and a moving trajectory pattern of the object corresponds to a 'straight line'.

It is apparent that various embodiments other than the examples described in connection with FIGS. 18 to 20 may be introduced by one of ordinary skill within the scope of the present invention.

While performing step S230, the electronic device 100 may identify whether a predetermined gesture is input from a user (S240). That is, according to a moving attribute of the object determined when performing the above-mentioned steps, the electronic device 100 may identify whether a predetermined gesture is input from a user.

If no gesture is input, the electronic device 100 may perform step S230 so that when the object is located over the end display point of the determined object, the object is not display on the display unit 151 any longer.

However, if a gesture is input from the user, the electronic device 100 may determine whether the input gesture is a first gesture or second gesture (S250).

If the first gesture is input, the electronic device 100 may perform a function corresponding to the event that has occurred (S260).

For instance, if the event that has occurred is a 'view reservation', the electronic device 100 may stop displaying contents on the display unit 151 and may display contents that are received through a channel reserved for view. For example, if the event that has occurred is call reception of the other electronic device, the electronic device 100 may connect a call received through the other electronic device and accordingly may request transmission of a screen displayed by the other electronic device to the electronic device 100. By doing so, if a screen associated with the call is output by the other electronic device, a user may perform the call to a called part through the electronic device 100 as if the user does using the other electronic device.

As another example, if the event that has occurred is 'text reception' of the other electronic device, the electronic device 100 may request transmission of information on the text received by the other electronic device. Accordingly, by displaying on the display unit 151 of the electronic device 100 information on the text received by the other electronic device, a user may identify the text directly through the electronic device 100 without the need for identifying the text through the other electronic device.

FIGS. 21 to 23 are views for describing examples of performing a function corresponding to an event according to the second embodiment of the present invention.

FIG. 21 illustrates an example where of changing screens displayed on the display unit 151 of the electronic device 100 when a first gesture is input from a user while the electronic device 100 displays an object corresponding to a 'view reservation' event moving the object. That is, when receiving the first gesture, the electronic device 100 may change a channel presently viewed by the user corresponding to the 'view reservation' into a channel reserved for view. Accordingly, the user may easily shift to the channel reserved for view so that the user may view desired contents.

FIG. 22 illustrates an example of changing screens displayed on the display unit 151 of the electronic device 100 when a first gesture is input from a user while the other electronic device (i.e., mobile phone A) displays an object corresponding to a 'call reception' event moving the object. In particular, (a) of FIG. 22 illustrates an example where a screen for video call that should be displayed through the other electronic device is displayed on the whole screen of the display unit 151 of the electronic device 100, and (b) of FIG. 22 illustrates an example where the screen for video call is displayed on a partial region R1 of the display unit 151.

FIG. 23 illustrates an example of changing screens displayed on the display unit 151 of the electronic device 100 when a first gesture is input from a user while the other electronic device (that is, mobile phone A) displays an object corresponding to a 'text reception' event moving the object, as shown in FIG. 20.

On the contrary, when a second gesture is input, the electronic device 100 may stop displaying the object at the time that the second gesture is input (S270). That is, the display of the object may be stopped before the object is moved up to a predetermined end display point of the object according to the predetermined moving attribute of the object.

FIG. 24 illustrates an example where display of the object is stopped in response to input of a second gesture according to the second embodiment.

As described in connection with FIG. 18, assuming that the moving attribute of the object is determined so that the object OB1 moves from a 'left and lower portion' of the screen to a 'right and lower portion' of the screen, as shown in (a) of FIG. 24, when the second gesture is input from a user at a time when the object is moved up to a 'central and lower portion' of the screen, as shown in (b) of FIG. 24, the display of the object OB1 may be stopped.

The first and second gestures may be any types of gestures as long as the first and second gestures may be distinguished from each other.

In the case that a gesture input while an object corresponding to an event that has occurred is displayed on the display unit 151 is neither the first gesture nor the second gesture, the electronic device 100 may disregard the input gesture or after identifying whether there is another function corresponding to the input gesture, the electronic device 100 may perform the corresponding function.

By displaying an object reflecting content of an event that has occurred to a user in different manners according to a predetermined event attribute, the electronic device 100 may provide the content of the event to user more intuitively. Further, the electronic device 100 may perform a predetermined operation associated with the event in response to a user's simple gesture input.

In the methods of controlling an electronic device according to the embodiments, each of the steps included in each embodiment is not inevitable and rather each embodiment may selectively include the steps. The steps included in each embodiment need not be performed in such order as described, and for example, a later step may be performed earlier than an earlier step.

In the methods of controlling an electronic device according to the embodiments, the embodiments may be performed alone or in combination. Further, steps included in an embodiment may be performed separately from or in combination with steps included in another embodiment.

Further, the methods of controlling an electronic device according to the embodiments may be stored in a computer readable recording medium in the form of codes or programs.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

The invention claimed is:

1. A method of controlling an electronic device, the method comprising:

obtaining, via a camera of the electronic device, an image including a plurality of users viewing a display unit of the electronic device;

recognizing a predetermined gesture made from a candidate user among the plurality of users for obtaining gesture control authority of the electronic device, wherein the recognizing the predetermined gesture made from the candidate user is performed while the candidate user does not have a current gesture control authority of the electronic device;

displaying, via the display unit, a graphic item corresponding to the candidate user;

displaying, via the display unit, a control graphic item indicating the current gesture control authority of the electronic device; and in response to recognizing a transfer control authority gesture for changing a display state of the control graphic item, selecting the graphic item corresponding to the candidate user based on the changed display state of the control graphic item and the transfer control authority gesture, and handing over the gesture control authority to the candidate user, wherein the changing the display state of the control graphic item includes gradually changing the display state of the control graphic item when the transfer control authority gesture is recognized.

2. The method of claim 1, wherein the graphic item includes one of an actual image or a virtual image of the candidate user.

3. The method of claim 1, wherein the transfer control authority gesture is input by a second user having the current gesture control authority of the electronic device.

4. The method of claim 3, further comprising:
displaying the graphic item and the control graphic item on the display unit in a relationship that reflects a physical relationship of the candidate user and the second user viewing the display unit.

5. The method of claim 1, wherein the changed display state of the control graphic item includes at least one of a changed location, size, pointing direction, color, brightness, and transparency of the control graphic item.

6. An electronic device comprising:
a display unit;
a camera configured to obtain an image including a plurality of users viewing the display unit; and
a control unit configured to:
recognize a predetermined gesture made from a candidate user among the plurality of users for obtaining gesture control authority of the electronic device while the candidate user does not have a current gesture control authority of the electronic device,
display, on the display unit, a graphic item corresponding to the candidate user,
display, on the display unit, a control graphic item indicating the current gesture control authority of the electronic device, and
in response to recognizing a transfer control authority gesture for changing a display state of the control graphic item, select the graphic item corresponding to the candidate user based on the changed display state of the control graphic item and the transfer control authority gesture, and hand over the gesture control authority to the candidate user,
wherein the changing the display state of the control graphic item includes gradually changing the display state of the control graphic item when the transfer control authority gesture is recognized.

7. The electronic device of claim 6, wherein the graphic item includes one of an actual image or a virtual image of the candidate user.

8. The electronic device of claim 6, wherein the transfer control authority gesture is input by a second user having the current gesture control authority of the electronic device.

9. The electronic device of claim 8, wherein the controller is further configured to:
display the graphic item and the control graphic item on the display unit in a relationship that reflects a physical relationship of the candidate user and the second user viewing the display unit.

10. The electronic device of claim 6, wherein the changed display state of the control graphic item includes at least one of a changed location, size, pointing direction, color, brightness, and transparency of the control graphic item.

11. A method of controlling an electronic device, the method comprising:
displaying, via a display unit of the electronic device, content;
obtaining, via a camera of the mobile terminal, an image of a user viewing the display unit;
displaying a graphic object indicating an event has occurred on the electronic device that moves from a first position to a second position on the display unit based on a moving attribute of the event;
providing a recognition opportunity for recognizing a predetermined first or second gesture from the user viewing the display unit while the graphic object is moving from the first position and before the graphic object reaches the second position on the display unit;
in response to recognizing the predetermined first or second gesture before the graphic object reaches the second position, executing a predetermined function for the event based on the recognized predetermined first or second gesture; and
in response to the graphic object reaching the second portion on the display unit without recognizing the predetermined first or second gesture, stopping the displaying of the graphic object.

12. The method of claim 11, wherein the moving attribute includes at least one of a start display point of the first position, an end display point of the second position, a moving speed of how fast the graphic object moves from the first position to the second position, and a moving trajectory of the graphic object.

13. The method of claim 11, wherein executing the predetermined function comprises:
performing a first function corresponding to the event when the predetermined first gesture is input while the graphic object is moved from the first position to the second position on the display unit.

14. The method of claim 13, wherein executing the predetermined function comprises:
stopping displaying the graphic object when the predetermined second gesture is input while the graphic object is moved from the first position to the second position on the display unit.

15. An electronic device comprising:
a display unit configured to display content;
a camera configured to obtain an image of a user viewing the display unit; and
a control unit configured to:
display a graphic object on the display unit indicating an event has occurred on the electronic device that moves from a first position to a second position on the display unit based on a moving attribute of the event,
provide a recognition opportunity to recognize a predetermined first or second gesture from the user viewing the display unit while the graphic object is moving from the first position and before the graphic object reaches the second position on the display unit,
in response to recognizing the predetermined first or second gesture before the graphic object reaches the second position, execute a predetermined function for the event based on the recognized predetermined first or second gesture, and
in response to the graphic object reaching the second portion on the display unit without recognizing the predetermined first or second gesture, stop the displaying of the graphic object.

16. The electronic device of claim 15, wherein the moving attribute includes at least one of a start display point of the first position, an end display point of the second position, a moving speed of how fast the graphic object moves from the first position to the second position, and a moving trajectory of the graphic object.

17. The electronic device of claim 15, wherein the execution of the predetermined function comprises performing a first function corresponding to the event when the predetermined first gesture is input while the graphic object is moving.

18. The electronic device of claim 17, wherein the execution of the predetermined function comprises stop displaying the object when the predetermined second gesture is input while the graphic object is moving.

19. The method of claim 1, wherein the graphic item includes a first graphic item representing the candidate user and a second graphic item representing a second user viewing the display unit.

20. The method of claim 19, wherein the candidate user is selected for gesture controlling the electronic device when the control graphic item is moved closer to the first graphic item, and the second user is selected for gesture controlling the electronic device when the control graphic item is moved closer to the second graphic item.

* * * * *